US011969384B2

(12) United States Patent
Montoya et al.

(10) Patent No.: US 11,969,384 B2
(45) Date of Patent: Apr. 30, 2024

(54) WHEELCHAIR WITH ACTUATOR CONTROLLED TILTING

(71) Applicants: Jennifer K. Montoya, Rome City, IN (US); Miguel A. Montoya, Rome City, IN (US)

(72) Inventors: Jennifer K. Montoya, Rome City, IN (US); Miguel A. Montoya, Rome City, IN (US)

( * ) Notice: Subject to any disclaimer, the term of this patent is extended or adjusted under 35 U.S.C. 154(b) by 80 days.

(21) Appl. No.: 16/822,792

(22) Filed: Mar. 18, 2020

(65) Prior Publication Data

US 2020/0297560 A1 Sep. 24, 2020

Related U.S. Application Data

(60) Provisional application No. 62/821,670, filed on Mar. 21, 2019.

(51) Int. Cl.

*A61G 5/08* (2006.01)
*A61G 5/10* (2006.01)
*A61G 5/12* (2006.01)

(52) U.S. Cl.

CPC .......... *A61G 5/0816* (2016.11); *A61G 5/1067* (2013.01); *A61G 5/125* (2016.11)

(58) Field of Classification Search

CPC ... A61G 5/0816; A61G 5/1067; A61G 5/0825
See application file for complete search history.

(56) References Cited

U.S. PATENT DOCUMENTS 3,858,938 A * 1/1975 Kristensson ........... A61G 5/125 297/423.26
4,140,192 A * 2/1979 Sharpe ................. A61G 5/0816 180/68.5
4,333,681 A * 6/1982 Nelson ................... A61G 5/006 297/83
4,431,076 A * 2/1984 Simpson .............. A61G 5/1059 296/65.07
4,949,408 A 8/1990 Trkla
(Continued)

FOREIGN PATENT DOCUMENTS

CN 108743082 A * 11/2018
EP 2 389 914 B1 2/2017
(Continued)

OTHER PUBLICATIONS

Healthline Lightweight Folding Transport Wheelchair taken from https://www.walmart.com/ip/HEALTHLINE-Removable-Lightweight-Inch-Manual-Ultra-Legrests-Full-Detachable-Light-Elevating-Medical-Transport-Comfortable-Arm-Folding-20-Wheelchair/284554360 (1 page).

*Primary Examiner* — Steve Clemmons
(74) *Attorney, Agent, or Firm* — Taylor IP, P.C.

(57) ABSTRACT

A wheelchair includes: a chassis configured to collapse in a width direction of the wheelchair; at least one wheel carried by the chassis; a seat assembly including a seat and a back support carried by the chassis, the back support defining a tilt angle relative to the seat and being pivotable to adjust the tilt angle; and a tilt assembly carried by the chassis and including at least one tilt actuator coupled to the back support, the at least one tilt actuator being configured to pivot the back support and adjust the tilt angle. The chassis is collapsible in the width direction while carrying the at least one actuator to reduce a width of the wheelchair.

7 Claims, 10 Drawing Sheets

(56) References Cited

U.S. PATENT DOCUMENTS

| | | | | |
|---|---|---|---|---|
| 5,758,897 | A * | 6/1998 | Kueschall | A61G 5/1054 280/42 |
| 5,868,461 | A * | 2/1999 | Brotherston | A47C 17/1756 5/618 |
| 6,154,690 | A | 11/2000 | Coleman | |
| 6,186,252 | B1 * | 2/2001 | Schaffner | A61G 5/1089 180/907 |
| 6,224,156 | B1 * | 5/2001 | Fleigle | A61G 5/121 297/354.1 |
| 6,527,340 | B1 | 3/2003 | Finch et al. | |
| 7,246,856 | B2 | 7/2007 | Kruse et al. | |
| 7,296,856 | B2 | 11/2007 | Rozaieski et al. | |
| 9,713,559 | B2 | 7/2017 | Hough et al. | |
| 9,861,541 | B2 * | 1/2018 | Boretto | A61G 5/0816 |
| 10,258,522 | B2 | 4/2019 | Kalf et al. | |
| 2003/0042779 | A1 * | 3/2003 | Yamasaki | A61G 5/0825 297/362.13 |
| 2006/0091706 | A1 * | 5/2006 | Christofferson | A61G 5/1091 297/130 |
| 2013/0264800 | A1 * | 10/2013 | Kobayashi | A61G 5/0875 280/650 |
| 2015/0209207 | A1 * | 7/2015 | Cooper | A61G 5/14 701/49 |
| 2017/0035633 | A1 * | 2/2017 | Amin | A61G 7/1059 |
| 2017/0360633 | A1 * | 12/2017 | Kalf | A61G 5/1067 |
| 2019/0125599 | A1 | 5/2019 | Mulhern et al. | |

FOREIGN PATENT DOCUMENTS

| | | | | |
|---|---|---|---|---|
| FR | 2861585 | A1 * | 5/2005 | A61G 5/0891 |
| GB | 2564728 | A * | 1/2019 | A61G 5/1067 |

* cited by examiner

WHEELCHAIR WITH ACTUATOR CONTROLLED TILTING

CROSS REFERENCE TO RELATED APPLICATIONS

This is a non-provisional application based upon U.S. provisional patent application Ser. No. 62/821,670, entitled “WHEELCHAIR WITH ACTUATOR CONTROLLED TILTING”, filed Mar. 21, 2019, which is incorporated herein by reference.

BACKGROUND OF THE INVENTION

1. Field of the Invention

The present invention relates to wheelchairs, and, more particularly, to adjustable tilt wheelchairs.

2. Description of the Related Art

Wheelchairs are well-known devices that are used to transport people who have difficulty walking on their own. A typical wheelchair includes a seat that is supported by a chassis with two or more wheels. Many wheelchairs have adjustable back supports to allow adjustment of the seated position of the wheelchair occupant. In many instances, adjustment of the back support is difficult because the occupant is currently seated in the wheelchair.

What is needed in the art is a wheelchair with an adjustable back support that can be easily adjusted.

SUMMARY OF THE INVENTION

The present invention provides a wheelchair with a tilt actuator that can adjust a tilt angle of the wheelchair while allowing collapse of the wheelchair.

In some exemplary embodiments provided according to the present invention, a wheelchair includes: a chassis configured to collapse in a width direction of the wheelchair; at least one wheel carried by the chassis; a seat assembly including a seat and a back support carried by the chassis, the back support defining a tilt angle relative to the seat and being pivotable to adjust the tilt angle; and a tilt assembly carried by the chassis and including at least one tilt actuator coupled to the back support, the at least one tilt actuator being configured to pivot the back support and adjust the tilt angle. The chassis is collapsible in the width direction while carrying the at least one actuator to reduce a width of the wheelchair.

In another exemplary embodiment, a wheelchair includes a chassis configured to collapse in a width direction of the wheelchair. The chassis includes a pair of chassis halves that are coupled to one another, with at least one of the chassis halves being movable in the width direction independently of the other chassis half. A pair of wheels are carried by a respective one of the chassis halves, with the pair of wheels defining a common rotational axis. A seat assembly includes a seat and a back support carried by each of the chassis halves. The back support defines a tilt angle relative to the seat and is pivotable to adjust the tilt angle. A pair of arm rests are coupled to a respective one of the chassis halves and are disposed on opposite sides of the seat. A tilt assembly is carried by the chassis and includes a pair of electrically powered tilt actuators. Each of the tilt actuators are coupled to the back support and a respective one of the chassis halves. Each of the tilt actuators are configured to coactively and simultaneously pivot the back support and thereby to adjust the tilt angle. The chassis is collapsible in the width direction while carrying the at least one tilt actuator to reduce a width of the wheelchair. Each of the tilt actuators include a mounting point that is below the seat of the seat assembly and defines a pivot axis that is below and rearward of the rotational axis of the at least one wheel. The back support is pivotable across a range of tilt angles between 90° and 180°. The tilt actuators are configured to pivot the back support across the entire range of tilt angles. A battery tray is coupled with and carried by a corresponding single one of the chassis halves. The battery tray is positioned below the seat and immediately adjacent to the corresponding chassis half. A battery is carried by the battery tray and electrically coupled to each of the tilt actuators. A tilt controller mounted to a forward end of one of the arm rests is electrically coupled to the battery and each of the tilt actuators. The tilt controller includes at least one activation switch allowing manual operation of the pair of tilt actuators by a wheelchair occupant with limited dexterity. The tilt controller is configured to output control signals to the pair of tilt actuators that cause the pair of tilt actuators to selectively pivot the back support either backward or forward to a selected tilt angle within the entire range of tilt angles.

In some exemplary embodiments, a method of collapsing a wheelchair is provided. The method includes: unlocking a pair of chassis halves from each other, the chassis halves together forming a chassis, the chassis carrying a back support, a seat, and at least one tilt actuator coupled to the back support and configured to adjust a tilt angle of the back support relative to the seat; and moving the chassis halves together in a width direction to reduce a width of the wheelchair without disconnecting the at least one tilt actuator from the back support.

One possible advantage that may be realized by exemplary embodiments disclosed herein is that the wheelchair can be collapsed without significant disassembly, providing a convenient way to store and/or transport the wheelchair when it is unoccupied.

Another possible advantage that may be realized by exemplary embodiments disclosed herein is that the tilt actuator can be controlled by a controller to precisely and reliably pivot the back support to one or more defined positions.

Yet another possible advantage that may be realized by exemplary embodiments disclosed herein is that the back support can be pivoted to a wide variety of positions to, for example, position a wheelchair occupant for transfer out of the wheelchair or position a wheelchair occupant to an accessible position for medical care.

BRIEF DESCRIPTION OF THE DRAWINGS

The above-mentioned and other features and advantages of this invention, and the manner of attaining them, will become more apparent and the invention will be better understood by reference to the following description of exemplary embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
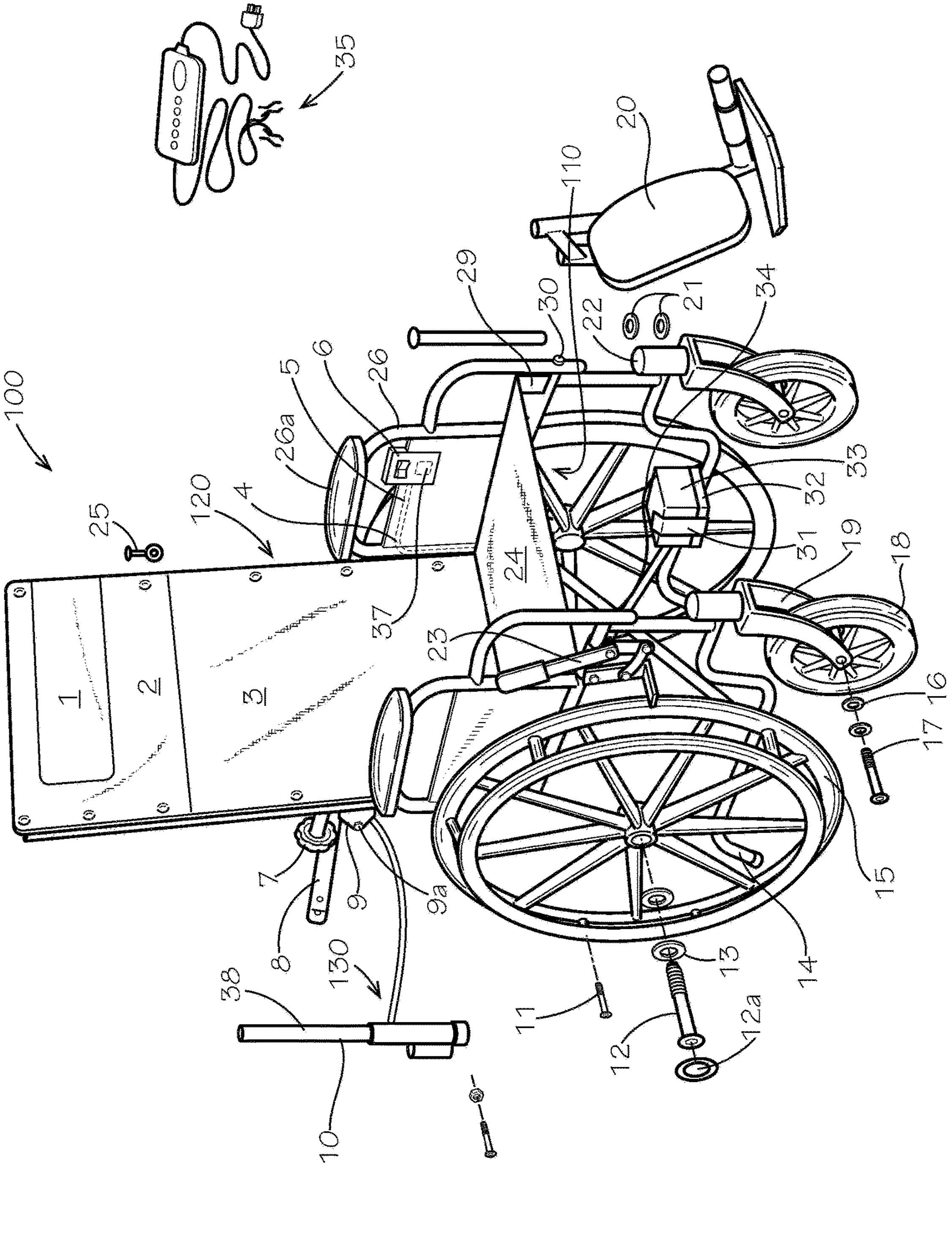
FIG. 1 is a partially exploded perspective view of an exemplary embodiment of a wheelchair, provided in accordance with the present invention.

Referring now to the drawings, and more particularly to FIG. 1, an exemplary embodiment of a wheelchair 100 provided according to the present disclosure is illustrated. The wheelchair 100 generally includes a chassis 110, a seat assembly 120 carried by the chassis 110, and a tilt mechanism 130 carried by chassis 110 and coupled to the seat assembly 120.

The chassis 110 carries the various components of the wheelchair 100. The chassis 110 may include multiple frame members, such as a side frame and a cross frame. A pair of front wheels 18 may be mounted to the chassis 110 on a front axle 17 by a bearing 16 and connect to the chassis 110 via a fork 19. The front wheels 18 may be, for example, casters that can pivot about a stem of the fork 19, with bearings 21 being provided to promote smooth pivoting. A fork stem lock 22 may be associated with the stem of the fork 19 to lock the wheels 18 in position, when desired.

A pair of rear wheels 15 can be mounted to the chassis 110 by rear axle bolts 12, which can have an axle cap 12*a*, and an associated rear axle bearing 13. In some embodiments, the rear wheels 15 have a larger diameter than the front wheels 18. The rear wheels 15 can include a rim with a handrim attached to the rim by one or more spacers 11. An anti-tipping mechanism 14 may also be associated with one or both of the rear wheels 15 to reduce the risk of the wheelchair 100 tipping during use. A wheel lock 23 may be coupled to one or both of the rear wheels 15 to lock movement of the wheels 15, when desired.

The seat assembly 120 may include an optional headrest pillow 1, which may be a neck support pad, at a top that is coupled to a headrest 2. The headrest pillow 1 and headrest 2 may support a neck and head of an occupant using the wheelchair 100. A back support 3, which may include upholstery and also be referred to as a "backrest," is coupled to the headrest 2 and is pivotably coupled to the chassis 110. A seat 24, which may also include upholstery, is coupled to the chassis 110. Upholstery screws 25 may be used to hold the upholstery against the back support 3 and the seat 24. A pair of arm rests 26, which may include pads 26*a*, are coupled to the chassis 110, with the arm rests 26 disposed on opposite sides of the seat 24. The arm rests 26 can be mounted on a slide tube 30 with an arm release button 29 that allows the arm rests 26 to slide off the chassis 110 and be removed from the wheelchair 100 during, for example, transportation or storage of the wheelchair 100. A pair of removable leg rests 20 can also be mounted to the chassis 110 to provide rests for an occupant's legs and feet during use. A spreader bar 8 and one or more associated spreader bar knobs 7 for locking the spreader bar 8 may be mounted to a rear of the back support 3.

Figure 2:
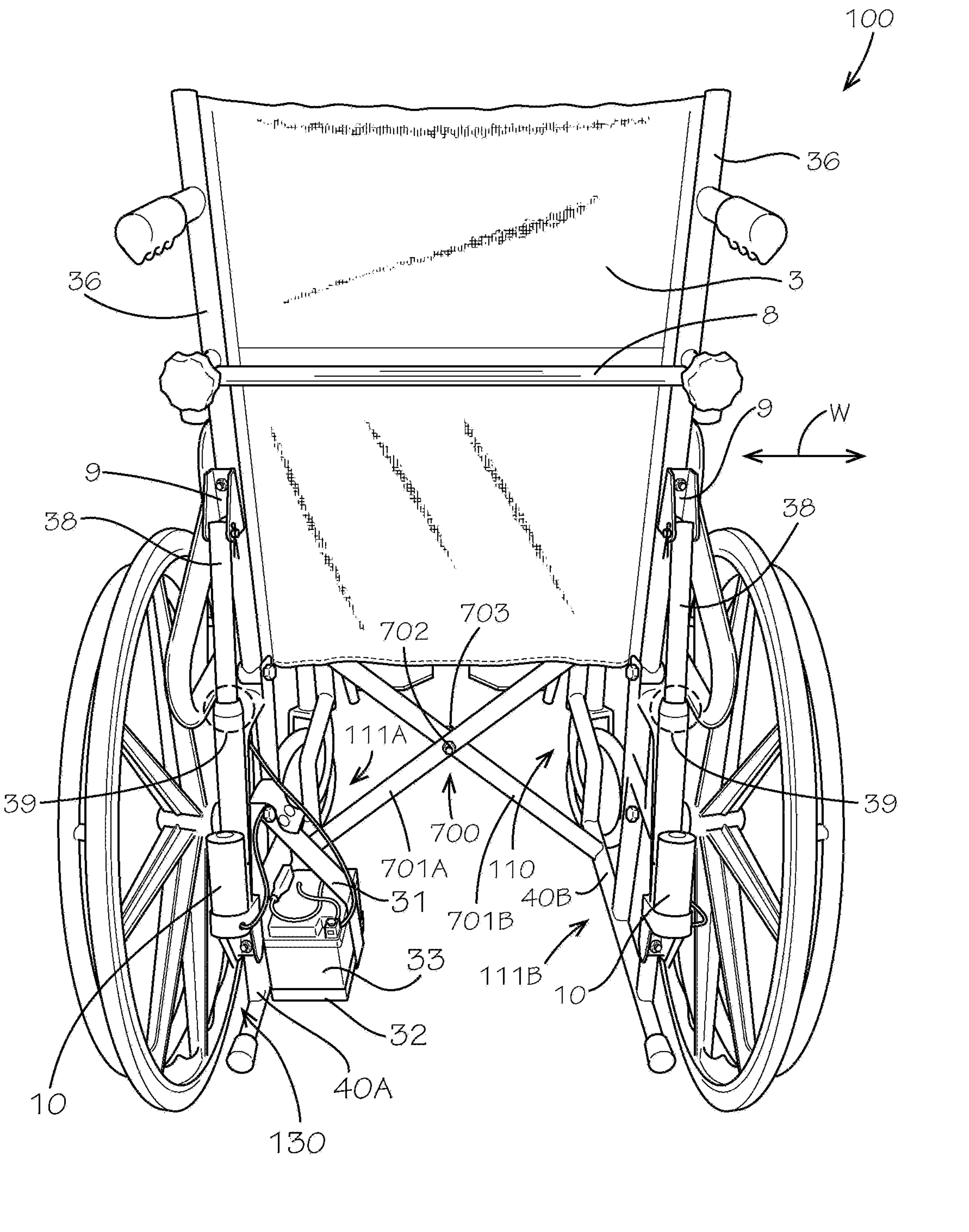
FIG. 2 is a rear view of the wheelchair of FIG. 1.
Figure 3:
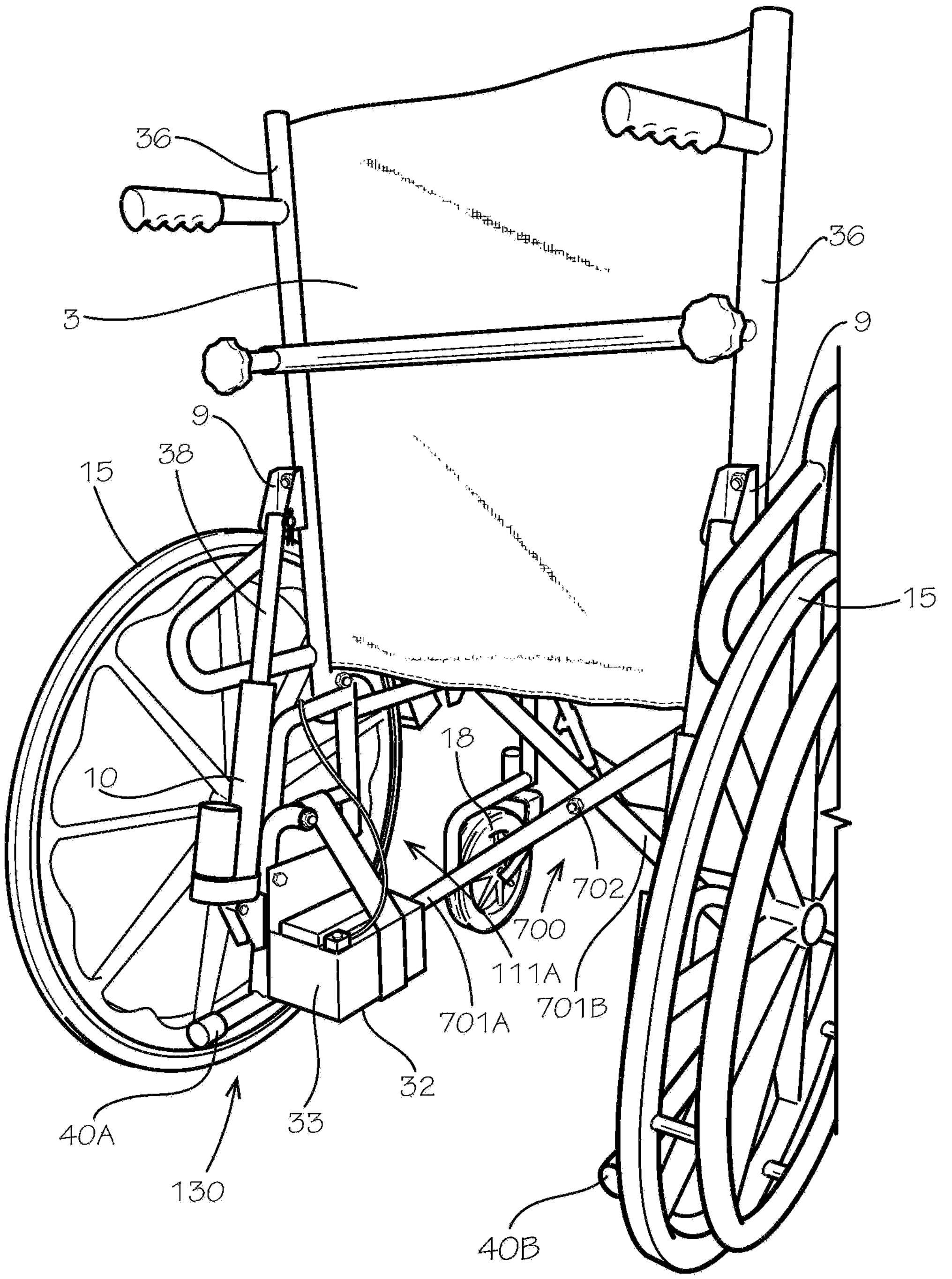
FIG. 3 is a rear perspective view of the wheelchair of FIGS. 1-2.

Referring still to FIG. 1, and referring also to FIGS. 2-3, it can be seen that the tilt mechanism 130 couples to the back support 3 to tilt the back support 3 with respect to the seat 24. To tilt the back support 3, the tilt mechanism 130 includes one or more tilt actuators, illustrated as a pair of tilt actuators 10, that are mounted to the back support 3 by respective actuator mounts 9 and fasteners 9*a*. The back support 3 may include a pair of back bars 36 that are each pivotably coupled to the chassis 110, with each of the actuator mounts 9 and tilt actuators 10 mounting to a respective back bar 36 of the back support 3. The back bars 36 may be coupled to each other by the spreader bar 8, which can prevent collapse of the back support 3 by keeping the back bars 36 spread apart. In some embodiments, the tilt actuators 10 are electrically powered actuators, illustrated as being powered by an electrically coupled battery 33, but it should be appreciated that the tilt actuators 10 can be any suitable type of actuators, such as pneumatic or hydraulic cylinders. The tilt actuators 10 can also be mounted to pivot brackets that are rigidly mounted to the chassis 110. The battery 33 may be mounted to the chassis 110 by a battery tray mount 32 that is partially supported by a battery strap 31. In some embodiments, the battery 33 is a rechargeable battery, with the wheelchair 100 also including a battery charger 35 for recharging the battery 33 and, if needed, a battery adapter 34 to allow the battery charger 35 to connect to a wall outlet.

To control tilting of the back support 3, a tilt controller 6 is provided that is electrically coupled to the tilt actuators 10. The tilt controller 6 may be electrically coupled to the tilt actuators 10 by, for example, a wire 5 that is at least partially held within a wire loom 4. The tilt controller 6 may be a two-way switch that allows a user to tilt the back support 3 backwards and forwards by pressing respective buttons on the tilt controller 6. Pressing the forward button, for example, may cause the tilt actuators 10 to each extend a respective actuator rod 38 to force the back support 3 forward so the back support 3 is more upright, i.e., closer to forming a 90° tilt angle with the seat 24. Pressing a backward button, in contrast, can cause the tilt actuators 10 to retract the actuator rods 38 and force the back support 3 rearward so the back support 3 is less upright, i.e., closer to forming a 180° tilt angle with the seat 24. Thus, an occupant in the wheelchair 100 can conveniently control tilting of the back support 3 to a desired tilt utilizing the tilt controller 6 without requiring assistance from a care provider to manually adjust the back support 3. In some embodiments, the actuator mounts 9 act as mechanical stops to prevent excessive retraction of the actuator rods 38; in such embodiments, the actuator mounts 9 contact the body of the tilt actuators 10 when the actuator rods 38 are fully retracted.

In some embodiments, the tilt controller 6 is mounted to, or adjacent to, one of the arm rests 26 for easy accessibility by an occupant in the wheelchair 100. The tilt controller 6 can be mounted to either arm rest 26, depending on the needs of the normal rider of the wheelchair 100. For example, if the normal rider of the wheelchair 100 has limited dexterity in their right hand, the tilt controller 6 can be mounted to the left arm rest 26 so the occupant can control the tilt of the wheelchair 100 using their left hand. In some embodiments, both arm rests 26 are equipped with a respective tilt controller 6 so an occupant can use either hand to adjust the tilt of the wheelchair 100. Such configurations may be useful in, for example, hospital settings where the wheelchair 100 is likely to be used by many different riders throughout its service life. The tilt controller 6 can also be placed at other locations on the wheelchair 100, such as one of the leg rests 20, depending on the occupant's physical capabilities. The wheelchair 100 may include a controller mount on each arm rest 26 and/or other locations on the wheelchair 100 that couples to the tilt controller 6 and holds the tilt controller 6 in the mounting location, allowing the tilt controller 6 to be placed in a variety of different locations of the wheelchair 100.

The tilt controller 6 may include at least one activation switch, such as a joystick and/or buttons, that can be used to control tilting of the back support 3. When a user activates the activation switch, the tilt controller 6 can output control signals to the tilt actuator(s) 10 that cause the tilt actuator(s) 10 to pivot the back support 3 and adjust the tilt angle. The activation switch(es) included in the tilt controller 6 may be adjusted, as needed, for use by a wheelchair occupant. For example, a tilt controller including a joystick may be desired by a user who has limited dexterity and is unable to reliably press buttons. It should thus be appreciated that the tilt controller 6 can be configured in many different ways to control the tilt actuator(s) 10 and adjust the tilt angle of the back support 3.

Figure 4:
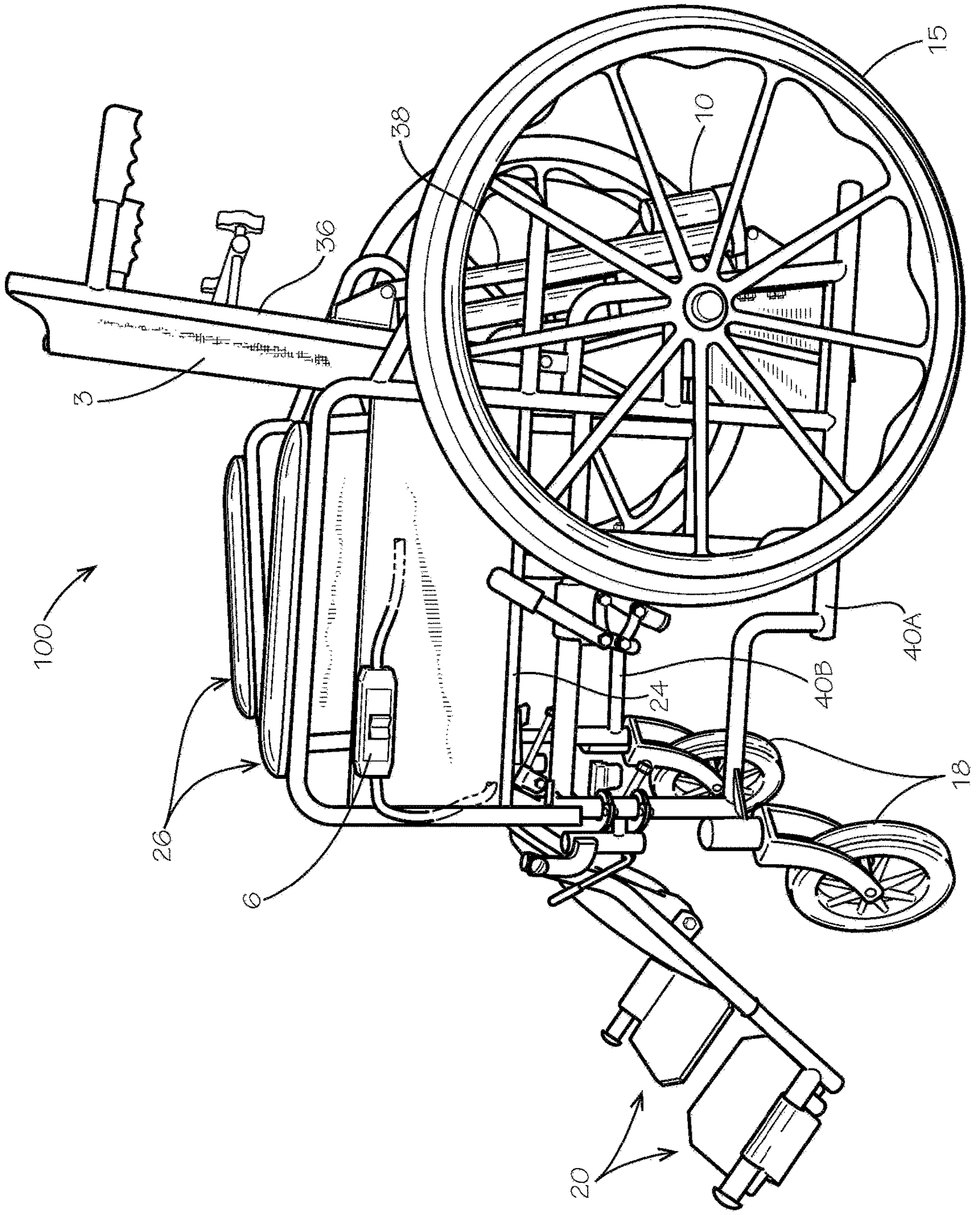
FIG. 4 is a side view of the wheelchair of FIGS. 1-3 with a back support of the wheelchair at a first tilt angle.
Figure 5:
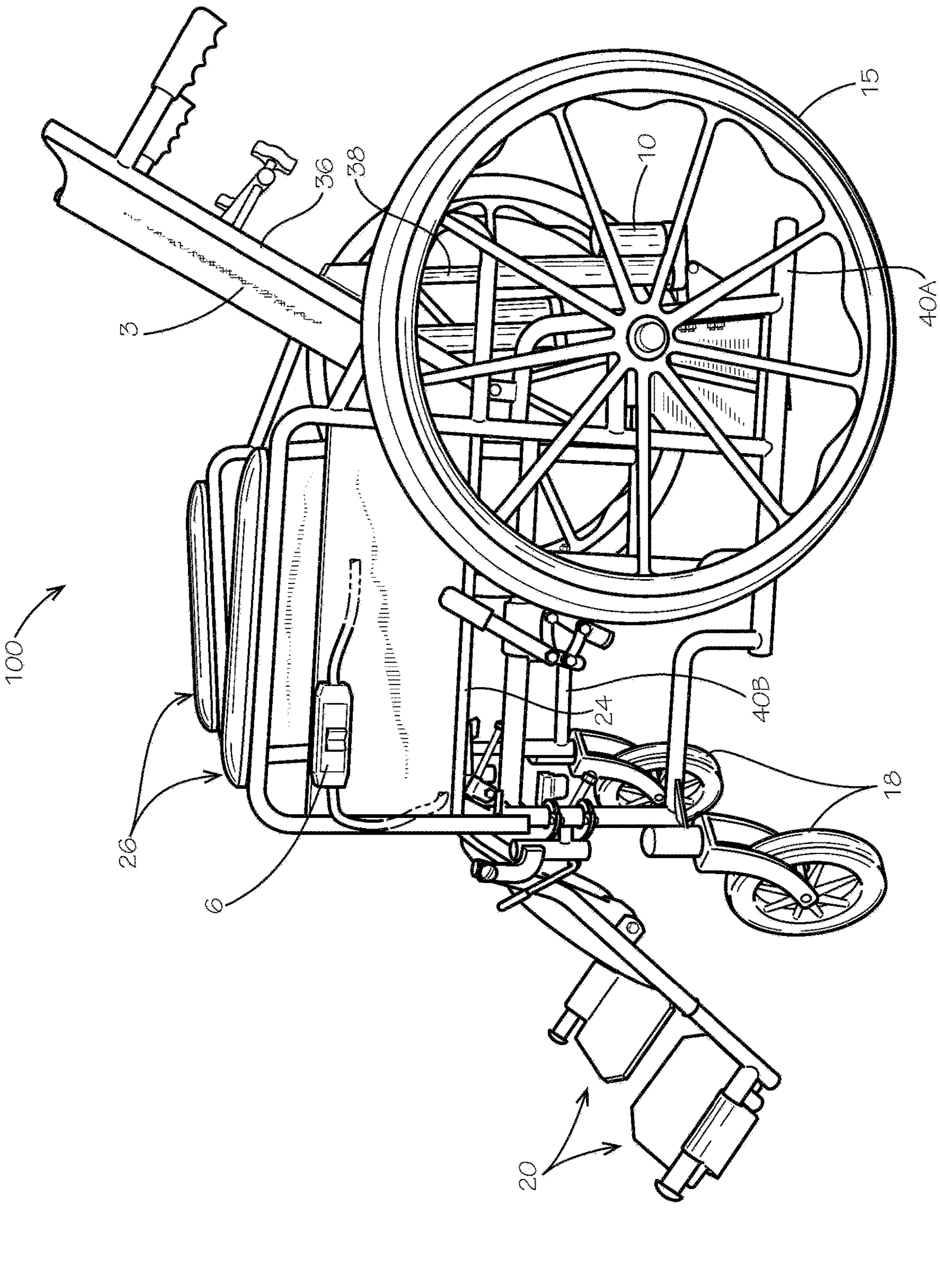
FIG. 5 is a side view of the wheelchair of FIGS. 1-4 after the back support has pivoted to a second tilt angle.
Figure 6:
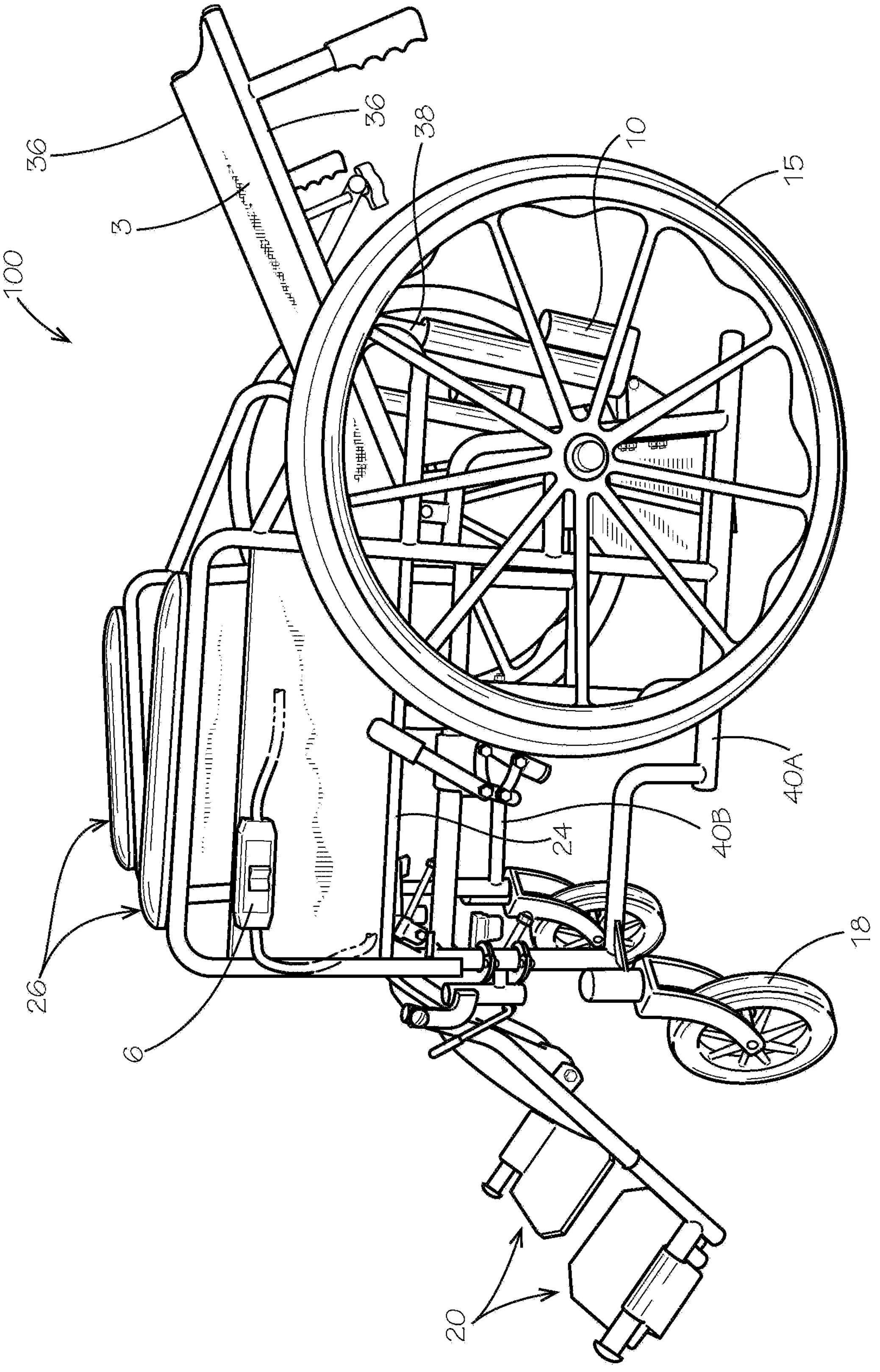
FIG. 6 is a side view of the wheelchair of FIGS. 1-5 after the back support has pivoted to a third tilt angle.

Referring now to FIGS. 4-6, the wheelchair 100 is illustrated in various positions with different degrees of tilt. As illustrated in FIG. 4, the wheelchair 100 is in an upright position with the back support 3 oriented at a first tilt angle that is nearly perpendicular with the seat 24. When the tilt controller 6 is activated to tilt the back support 3 rearwardly, as illustrated in FIG. 5, the tilt actuators 10 can retract their respective actuator rods 38 to pull the back support 3 rearwardly and cause rearward tilt of the back support 3 to a second tilt angle that is greater than the first tilt angle illustrated in FIG. 4. The tilt actuators 10 may also be pivotably mounted to their respective pivot brackets and pivot during tilting of the back support 3. Further tilting of the back support 3 to a third tilt angle, which is illustrated in FIG. 6, can be achieved by further retraction of the actuator rods 38 of the tilt actuators 10. To return the back support 3 to a more upright position, the tilt controller 6 can be activated to cause extension of the actuator rods 3 of the tilt actuators 10, as can be appreciated from FIGS. 4-6. The back support 3 may be pivotable across a range of tilt angles between 90° and 180°, with the tilt actuators 10 being configured to pivot the back support 3 across the entire range of tilt angles. In some embodiments, the tilt actuators 10 are configured so extension of the actuator rods 38 causes the back support 3 to tilt backward and retraction of the actuator rods 38 causes the back support 3 to tilt forward. It should thus be appreciated that the tilt actuators 10 may be configured in a variety of ways to pivot the back support 3 across the range of tilt angles.

In some embodiments, the tilt controller 6 includes a memory 37 that allows the tilt controller 6 to be programmable. For example, the tilt controller 6 may be configured to store one or more defined tilt angles in the memory 37. The defined tilt angle(s) may be programmed into the memory 37 by a user and/or by the manufacturer to allow for easy, reproducible adjustment of the back support 3 to various positions. Exemplary tilt angles may be, but are not limited to, the first tilt angle illustrated in FIG. 4 and/or a tilt angle of 180° where the back support 3 is generally in-plane with the seat 24. When a user recalls the defined tilt angle(s) using the tilt controller 6, which may be done in a variety of known ways, the tilt controller 6 outputs one or more control signals to the tilt actuators 10 to pivot the back support 3 to the stored defined tilt angle that is selected. The tilt controller 6 may be configured to determine a current tilt angle of the back support 3 relative to the seat 24 based on a variety of measurements, including but not limited to an extension of the actuator rod(s) 38 of the tilt actuator(s) 10 and/or a direct measurement of the tilt angle of the back support 3. In this respect, the tilt controller 6 may be electrically coupled to one or more sensors 39 that output measurement signals to the tilt controller 6 that correspond to a respective measurement. It should thus be appreciated that the tilt controller 6 can be configured in a variety of ways to make it easier for an occupant and/or a healthcare professional to reliably adjust the tilt angle of the back support 3 to a number of defined tilt angles.

From the foregoing, it should be appreciated that the wheelchair 100 provided in accordance with the present disclose allows an occupant, or other user, to conveniently and easily adjust a tilt angle of the wheelchair 100 using the tilt controller 6 and tilt actuator(s) 10. Control of the tilt actuator(s) 10 by the tilt controller 6 allows an occupant or other user to adjust the tilt angle of the wheelchair 100 without having to, for example, pivotably unlock the back support 3 from the chassis 110 and manually tilt the back support 3 before pivotably re-locking the back support 3. Further, the tilt angle can be gradually adjusted by the tilt controller 6 and tilt actuator(s) 10 to find a position of the back support 3 that is comfortable for the occupant and/or conducive for medical help to move the occupant. Since the tilt controller 6 can be easily operated by an occupant without assistance, an occupant can independently adjust the tilt of the wheelchair 100 to improve their comfort whenever it is desired. Thus, the wheelchair 100 provided according to the present disclosure allows easy and convenient adjustment of the tilt angle of the wheelchair 100.

Figure 7:
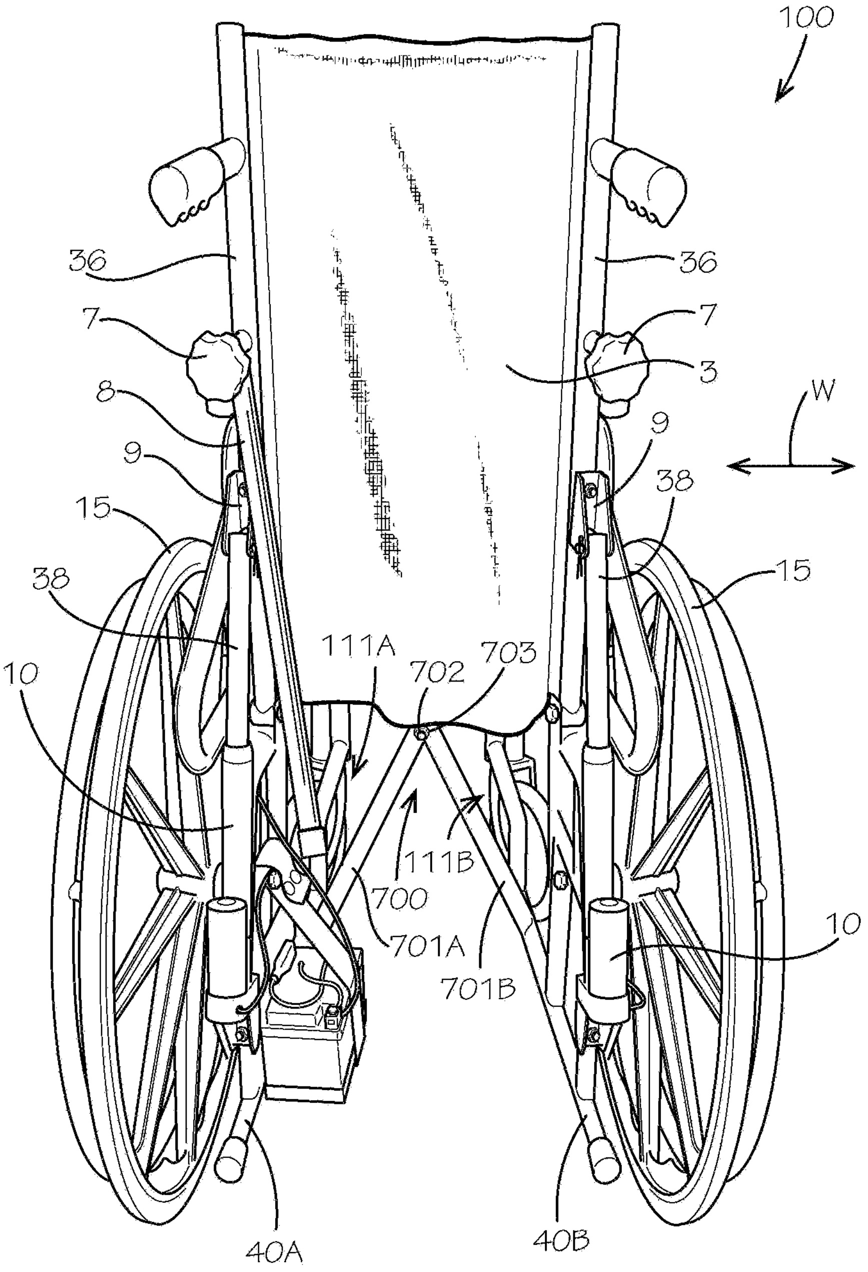
FIG. 7 is a rear view of the wheelchair of FIGS. 1-6 after the wheelchair has been collapsed in a width direction.
Figure 8:
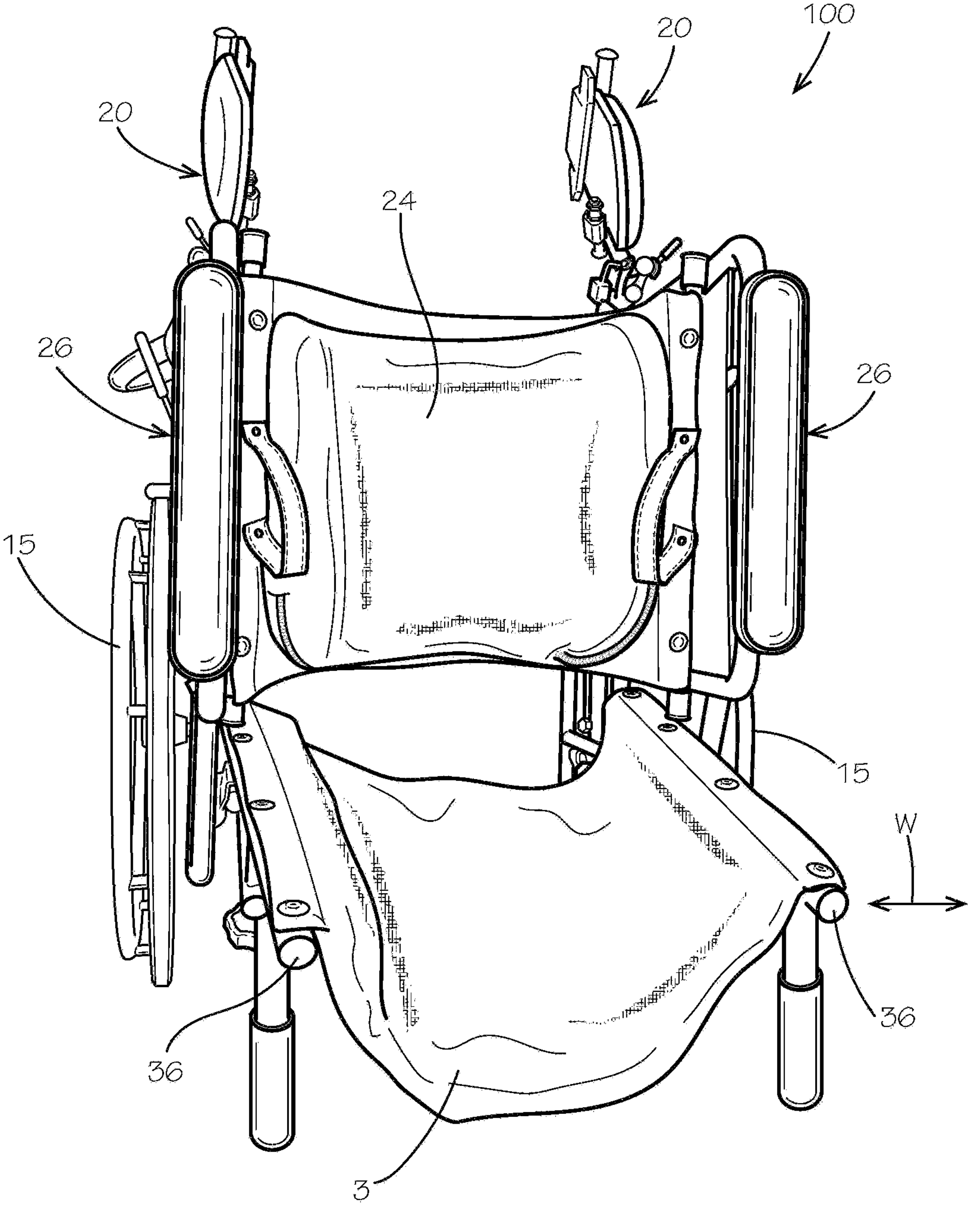
FIG. 8 is a top view of the wheelchair of FIGS. 1-7 after the back support of the wheelchair has been collapsed.
Figure 9:
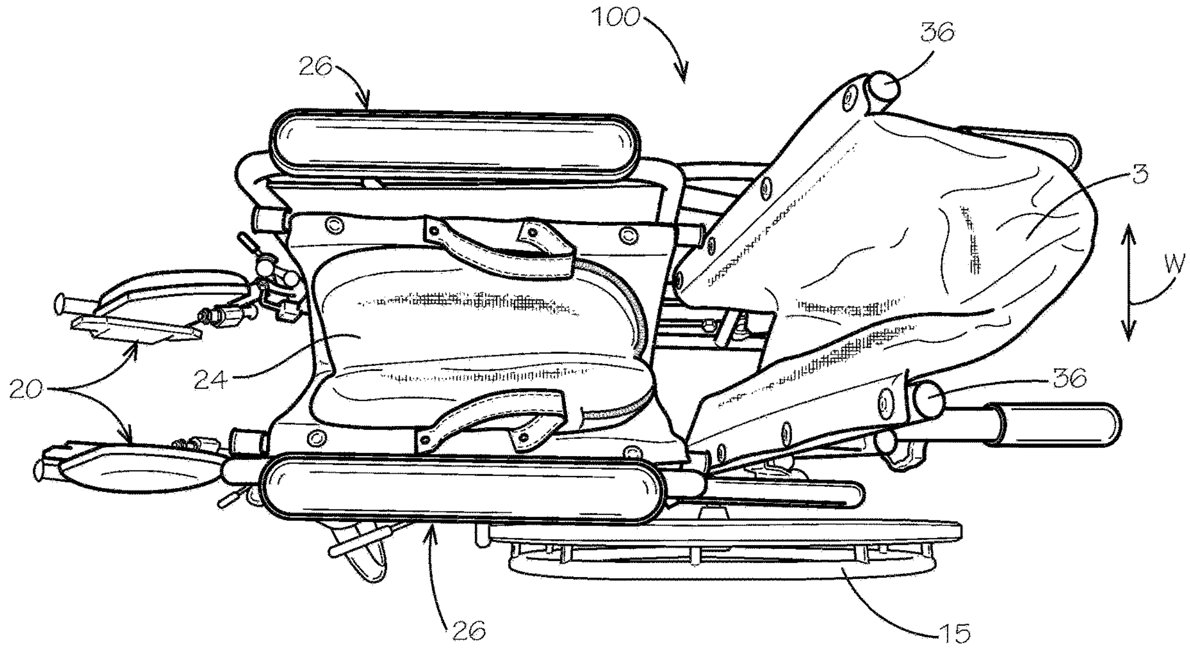
FIG. 9 is a top view of the wheelchair of FIGS. 1-8 after the back support and chassis have been collapsed in the width direction to reduce an overall width of the wheelchair.

Referring now to FIGS. 7-9, the wheelchair 100 is illustrated in a collapsed position where the wheelchair 100 has been collapsed in a width direction W, defined as a direction that is parallel to an axis extending through a rotational center of the wheels 15 or 18. The wheelchair 100 may be placed in the collapsed position to, for example, transport and/or store the wheelchair 100. To collapse the wheelchair 100 in the width direction W, a collapse mechanism 700 can be coupled to chassis bars 40A, 40B of the chassis 110. The collapse mechanism 700 can include a pair of collapse bars 701A, 701B that are pivotably coupled together at a pivot 702, which may be a pivot pin or any other type of element that pivotably couples the collapse bars 701A, 701B together.

A pivot lock 703, illustrated as a screw, may be tightened or loosened to lock or unlock, respectively, the collapse bars 701A, 701B from each other. When the collapse bars 701A, 701B are unlocked, the collapse bars 701A, 701B can be pivoted together about the pivot 702 to collapse the wheelchair 100 in the width direction W, as can be seen in FIG. 7. The spreader bar 8 is also unlocked by loosening the spreader bar knob(s) 7, which allows the spreader bar 8 to drop and the back support 3 to collapse in the width direction W by pulling up on the seat 24 to collapse the back bars 36 toward each other in the width direction W. In this respect, the chassis 110 can be formed as two chassis halves 111A, 111B that are movably connected together by the collapse mechanism 700 and by the back bars 36 via the spreader bar 8 such that the wheelchair 100 can be collapsed in the width direction W. While both chassis halves 111A, 111B are illustrated and described as being movable, it should be appreciated that, in some embodiments, only one of the chassis halves 111A, 111B is movable; in such an embodiment, the chassis 110 is collapsible in the width direction W by moving the movable chassis half toward the other chassis half. Further, while the chassis halves 111A, 111B are described as both being moved in the width direction W, it should be appreciated that each of the chassis halves 111A, 111B is movable in the width direction W independently of the other chassis half 111B, 111A by pivoting only one of the collapse bars 701A, 701B about the pivot 702.

As can be appreciated from FIG. 7, the mounting of the tilt actuators 10 to the back support 3 does not interfere with collapse of the wheelchair 100. Each of the tilt actuators 10 may be coupled to a respective one of the back bars 36 and chassis halves 111A, 111B, as illustrated, so the tilt actuators 10 do not need to be removed to collapse the chassis 110, and thus the wheelchair 100, in the width direction W, i.e., the chassis 110 is collapsible in the width direction W while carrying the tilt actuators 10. Thus, the tilt mechanism 130 allows controlled tilting of the wheelchair 100 by the tilt actuators 10 while still allowing the wheelchair 100 to easily and conveniently collapse for storage and/or transportation.

While some known wheelchairs include an actuator to tilt the back support, such wheelchairs are large and bulky. This makes transportation and storage of the wheelchairs difficult for many users and/or their healthcare providers. Particularly, known wheelchairs with actuators to tilt the back support are unable to collapse in the width direction, which makes it difficult to place the wheelchair in a transport vehicle, such as a car. The wheelchair 100 provided according to the present invention, on the other hand, has a chassis 110 that is collapsible in the width direction W while the tilt actuator(s) 10 is carried by the chassis 110. The chassis 110 being collapsible allows the width of the wheelchair 100 to be considerably reduced, making it easier to transport and/or store the wheelchair 100. Further, it is relatively easy to collapse the wheelchair 100 because the tilt actuator(s) 10 does not need to be removed in order to collapse the chassis 110. In this respect, the wheelchair 100 provided according to the present invention is easy to transport and can be transported in common passenger vehicles, such as in the trunk.

Figure 10:
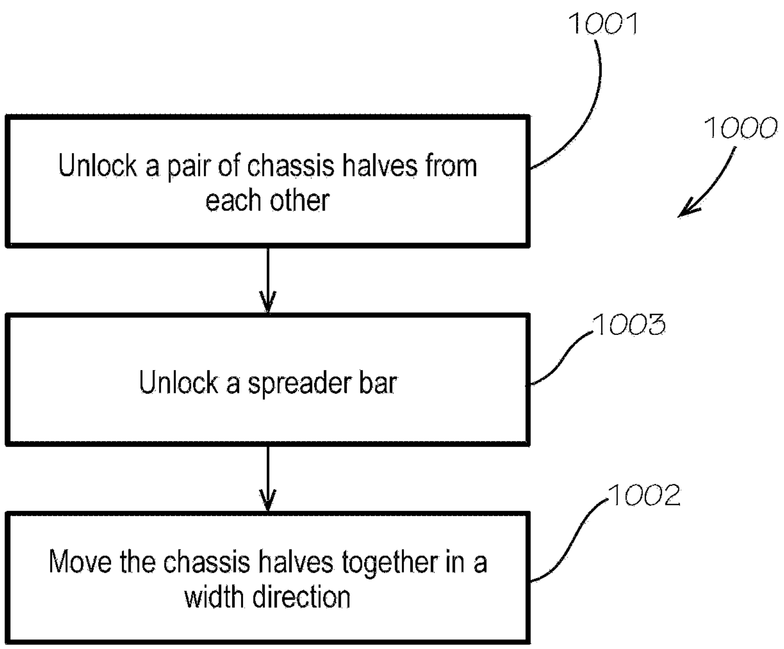
FIG. 10 is a flow chart illustrating an exemplary embodiment of a method of collapsing a wheelchair, provided in accordance with the present invention.

Referring now to FIG. 10, an exemplary embodiment of a method 1000 of collapsing a wheelchair 100 provided according to the present invention is illustrated. The method 1000 includes unlocking 1001 a pair of chassis halves 111A, 111B, which together form a chassis 110, from each other. The chassis 110 carries a back support 3, a seat 24, and at least one tilt actuator 10 coupled to the back support 3 and configured to adjust a tilt angle of the back support 3 relative to the seat 24. Unlocking 1001 the chassis halves 111A, 111B from each other may include, for example, loosening a pivot lock 703 of a collapse mechanism 700 including a pair of collapse bars 701A, 701B that are pivotably coupled together and couple the chassis halves 111A, 111B together at a pivot 702. The chassis halves 111A, 111B are moved 1002 together in a width direction W to reduce a width of the wheelchair 100 without disconnecting the at least one tilt actuator 10 from the back support 3, as previously described. In some embodiments, the method 1000 further includes unlocking 1003 a spreader bar 8 that couples together two back bars 36 on opposite sides of the back support 3. After the wheelchair 100 is collapsed, the wheelchair 100 can be expanded to its normal operating width by the reverse actions, i.e., moving the chassis halves 111A, 111B away from each other in the width direction W and locking the chassis halves 111A, 111B together.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A wheelchair, comprising:

a chassis configured to collapse in a width direction of the wheelchair, the chassis including a pair of chassis halves that are coupled to one another, at least one of the chassis halves being movable in the width direction independently of the other chassis half;

a pair of wheels, each of the wheels being carried by a respective one of the chassis halves, the pair of wheels defining a common rotational axis;

a seat assembly including a seat and a back support carried by each of the chassis halves, the back support defining a tilt angle relative to the seat and being pivotable to adjust the tilt angle;

a pair of arm rests, each of the arm rests being coupled to a respective one of the chassis halves and disposed on opposite sides of the seat;

a tilt assembly carried by the chassis and including a pair of electrically powered tilt actuators, each of the tilt actuators being coupled to the back support and a respective one of the chassis halves, each of the tilt actuators being configured to coactively and simultaneously pivot the back support and thereby to adjust the tilt angle, the chassis being collapsible in the width direction while carrying the pair of tilt actuators to reduce a width of the wheelchair, each of the tilt actuators comprising a mounting point that is below the seat of the seat assembly and that defines a pivot axis that is below and rearward of the rotational axis of the at least one wheel, the back support being pivotable across a range of tilt angles between 90° and 180°, each of the tilt actuators being configured to pivot the back support across the entire range of tilt angles;

a battery tray being coupled with and carried by a corresponding single one of the chassis halves, the battery tray being positioned below the seat and immediately adjacent to the corresponding chassis half;

a battery carried by the battery tray, the battery being electrically coupled to each of the tilt actuators; and a tilt controller mounted to a forward end of one of the arm rests, the tilt controller being electrically coupled to the battery and each of the tilt actuators, the tilt controller including at least one activation switch allowing manual operation of the pair of tilt actuators by a wheelchair occupant with limited dexterity, the tilt controller being configured to output control signals to the pair of tilt actuators that cause the pair of tilt actuators to selectively pivot the back support either backward or forward to a selected tilt angle within the entire range of tilt angles.

2. The wheelchair of claim 1, further comprising a collapse mechanism coupling the chassis halves to each other, the collapse mechanism including a pair of collapse bars pivotably coupled together at a pivot.

3. The wheelchair of claim 2, wherein each of the collapse bars is coupled to a respective one of the chassis halves.

4. The wheelchair of claim 1, wherein the back support includes a pair of back bars and each of the pair of tilt actuators is coupled to a respective one of the back bars.

5. The wheelchair of claim 4, further comprising a pair of mounting brackets, each of the mounting brackets coupling one of the tilt actuators to its respective back bar.

6. The wheelchair of claim 4, further comprising a spreader bar coupled to each of the back bars and configured to prevent collapse of the back support.

7. The wheelchair of claim 1, wherein the tilt controller includes a memory, the tilt controller being configured to store at least one defined tilt angle in the memory and output control signals to the at least one tilt actuator to cause the at least one tilt actuator to pivot the back support to the stored at least one defined tilt angle.

* * * * *